Patented Nov. 29, 1932

1,889,298

UNITED STATES PATENT OFFICE

KARL SCHNITZSPAHN, OF OFFENBACH-ON-THE-MAIN, GERMANY, ASSIGNOR TO GENERAL ANILINE WORKS, INC., OF NEW YORK, N. Y., A CORPORATION OF DELAWARE

SOLID DIAZOAZOMETAL HALIDE DOUBLE SALT

No Drawing. Application filed September 29, 1927, Serial No. 222,943, and in Germany October 5, 1926.

My invention relates to solid diazoazo metallic halide double salts corresponding probably to the general formula:

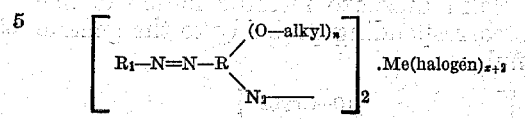

wherein R and $R_1$ mean aryl residues, not containing a sulfonic or carboxylic group, $n$ a number being at least 1 and $x$ a number corresponding to the valence of the metal, signified by Me. The diazosalts may be obtained by diazotizing in the usual manner aminoazobodies, derived from diazocompounds not containing a sulfonic or carboxylic group and aminoderivatives of mono- or polyvalent aryloxyalkylethers, such as orthoaminophenolether, aminocresolether, aminohydroquinone ethers, 1.2 - aminonaphtholethers and derivatives capable of forming para-aminoazobodies, and separating the diazosalts in form of metallic double salts by adding a metallic halide salt and preferably an alkali metal halide salt, such as common salt to the diazo solutions. As such metallic halide salts those of heavy metals, such as zinc chloride or stannic chloride, mercury-, auric- and platinic chloride may be named.

It was hitherto unknown that the monodiazoazocompounds of the aforesaid chemical constitution can be isolated in a solid form and that the stability of the solid products is sufficient for the use for dyeing and printing purposes, and only the corresponding diazo solutions new made from the bases were used hitherto, for instance, for the process of U. S. A. Patent No. 1,498,417. Therefore, the present solid diazoazocompounds are new products, they are orange— to reddish brown colored powders soluble in water with a yellowish to reddish brown color, they surpass the hitherto isolated solid diazocompounds of other aminoazocompounds not containing the typical alkoxygroup, for instance, those described in German Patent 89,437, in their properties, especially by their good solubility and their excellent stability.

The stability and the commercial value of the new solid diazoazocompounds is apparently a consequence of the chemical constitution of the aforesaid aminoazocompounds, characterized by an alkoxygroup, standing in ortho-position to the aminogroup to be diazotized, the good properties less depending from the form of separation.

The new solid diazocompounds may be mixed with partly or totally anhydrous salts and other suitable diluents, they may be used for producing azodyestuffs on the fiber and allow to supply the user with diazoazocompounds yielding particularly valuable disazodyestuffs in a most concentrated form immediately ready for the use.

In order to further illustrate my invention the following examples are given, the parts being by weight and all temperatures in centigrade degrees, but it is understood that my invention is not limited to the particular products or reacting conditions mentioned therein.

*Example 1.*—A diazosolution obtained by diazotizing in dilute hydrochoric acid 272 parts of the para-amino-azo-body derived from diazotized meta-nitro-aniline and ortho-anisidine is precipitated by adding, for instance, 75 parts of zinc chloride and 1000 parts of common salt. The zinc chloride double salt corresponding probably to the formula:

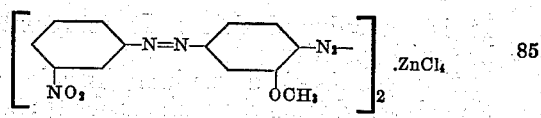

separates in crystalline form, it is filtered off and dried at about 40–50°. Advantageously it may be mixed with a suitable diluent before or after being dried. It represents an orange-brown powder, soluble in water with a brownish color.

*Example 2.*—A diazonium chloride solution obtained from 302 parts of the para-amino-azo-body: para-nitrobenzene-azo-2-amino-1.4-dimethoxybenzene is precipitated with 100 parts of zinc chloride and a sufficient amount of common salt. The zinc chloride double salt thus obtained corresponding probably to the formula:

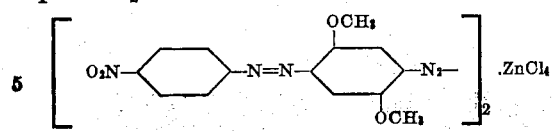

separates. It is dried and mixed with usual diluents. It forms a reddish brown powder, soluble in water with a brownish color.

In the same manner the aminoazobodies: 2-methoxy-4- and -5-nitrobenzene-azo-2-amino-1.4-dimethoxybenzene and ortho- and para-nitrobenzene-azo-2-amino-1.4-diethoxybenzene may be converted into solid diazosalts.

*Example 3.*—A diazonium chloride solution, prepared from 326 parts of the aminoazobody, derived from diazotized ortho-chloroaniline and 1-amino-2-ethoxynaphthalene, is treated as described in the foregoing example. The diazosalt obtained corresponds probably to the formula:

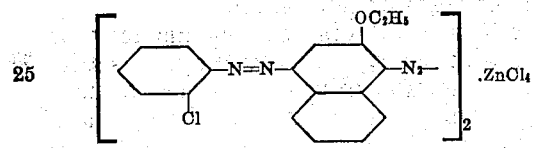

It forms a brownish powder, soluble in water with a brownish color.

In the same manner the diazosalts of the aminoazobodies derived from diazotized 1- and 2-naphthylamine and 4-nitro-1-naphthylamine and from aminohydroquinone-dimethylether may be separated in solid form.

*Example 4.*—A diazonium chloride solution, obtained from 276 parts of the para-aminoazobody: orthochlorobenzene-azo-3-amino-4-methoxy-1-methylbenzene is precipitated with about 150 parts of stannic chloride and a little quantity of common salt. The double salt thus separating corresponds probably to the formula:

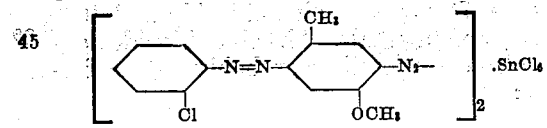

It is filtered and dried. It represents a brownish powder.

*Example 5.*—A diazonium chloride solution obtained from the aminoazobody: 2-methoxybenzene-azo-2-amino-1.4-dimethoxybenzene is treated as described in the foregoing example. The double salt thus separating corresponds probably to the formula:

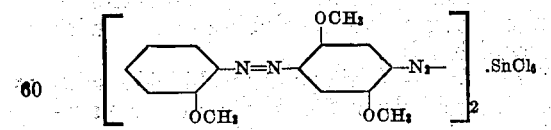

It is filtered and dried. It represents a brownish powder.

*Example 6.*—A diazonium chloride solution obtained from 300 parts of the aminoazobody: para-nitro-benzene-azo-3-amino-4-methoxy-1-methylbenzene is precipitated with, for instance, 75 parts of zinc chloride and common salt. The zinc chloride double salt, thus separating in crystalline form, corresponds probably to the formula:

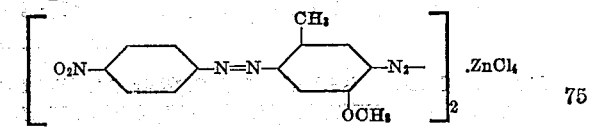

It is filtered and dried.

In the same manner the aminoazobodies, derived from diazotized 4- and 5-nitro-2-amino-1-anisol, 1- and 2-naphthylamine and 4-nitro-1-napthylamine and from para-cresidine may be converted into solid salts.

I claim:

1. Solid diazoazo metallic halide double salts corresponding probably to the general formula:

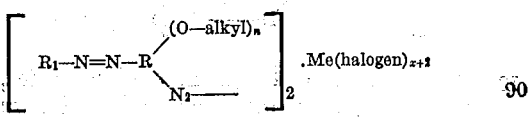

wherein R and $R_1$ mean aryl radicals not containing a sulfonic or carboxylic acid group, $n$ stands for a number being at least 1, and $x$ for a number corresponding to the valence of the metal signified by Me, which solid diazoazo double salts are orange to reddish-brown powders, soluble in water with a yellowish to reddish-brown color.

2. Solid diazoazo metallic halide double salts corresponding probably to the general formula:

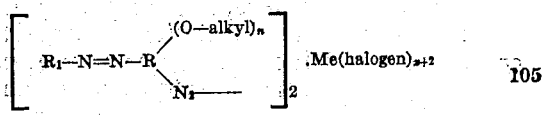

wherein R and $R_1$ mean aryl radicals not containing a sulfonic or carboxylic acid group, $n$ stands for a number being at least 1, and $x$ for a number corresponding to the valence of the metal signified by Me, and wherein one -O-alkyl group stands in ortho-position to the diazonium group, which solid diazoazo double salts are orange to reddish-brown powders, soluble in water with a yellowish to reddish-brown color.

3. Solid diazoazo metallic chloride double salts corresponding probably to the general formula:

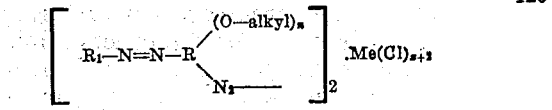

wherein R and $R_1$ mean aryl radicals not containing a sulfonic or carboxylic acid group, $n$ stands for a number being at least 1, Me stands for a metal of the group consisting of Zn and Sn, and $x$ for a number corresponding to the valance of the metal, and wherein one -O-alkyl group stands in ortho-position to the diazonium group, which solid diazoazo double salts are orange to reddish-brown powders, soluble in water with a yellowish to reddish-brown color.

4. Solid diazoazo zinc chloride double salt corresponding probably to the formula:

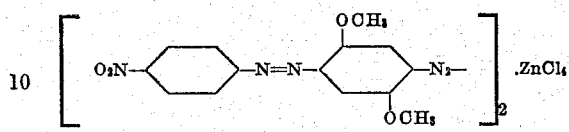

which solid diazoazo zinc chloride double salt is a reddish-brown powder, soluble in water with a brownish color.

5. Solid diazoazo zinc chloride double salt corresponding probably to the formula:

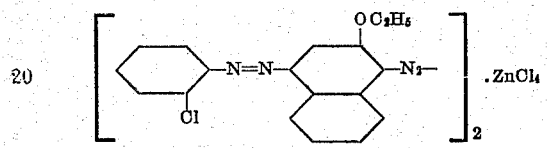

which solid diazoazo zinc chloride double salt is a brownish powder, soluble in water with a brownish color.

6. Solid diazoazo stannic chloride double salt corresponding probably to the formula:

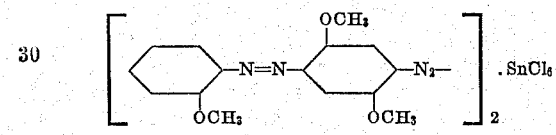

which solid diazoazo stannic chloride double salt is a brownish powder.

In testimony whereof, I affix my signature.

KARL SCHNITZSPAHN.